April 1, 1930.     H. FROMM     1,753,047

SHOCK ABSORBER

Filed April 5, 1929

Herbert Fromm
INVENTOR

BY Victor J. Evans
ATTORNEY

Patented Apr. 1, 1930

1,753,047

UNITED STATES PATENT OFFICE

HERBERT FROMM, OF HAMBURG, WISCONSIN

SHOCK ABSORBER

Application filed April 5, 1929. Serial No. 352,856.

This invention relates to shock absorbers for the seats of motor vehicles and other vehicles, aircrafts, etc., the general object of the invention being to provide a plurality of expansion springs for supporting the seat in such a manner that vibrations, shocks and the like are absorbed by the springs and thus not transmitted to the occupant of the seat so that the occupant can ride in comfort.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:—

Figure 1:
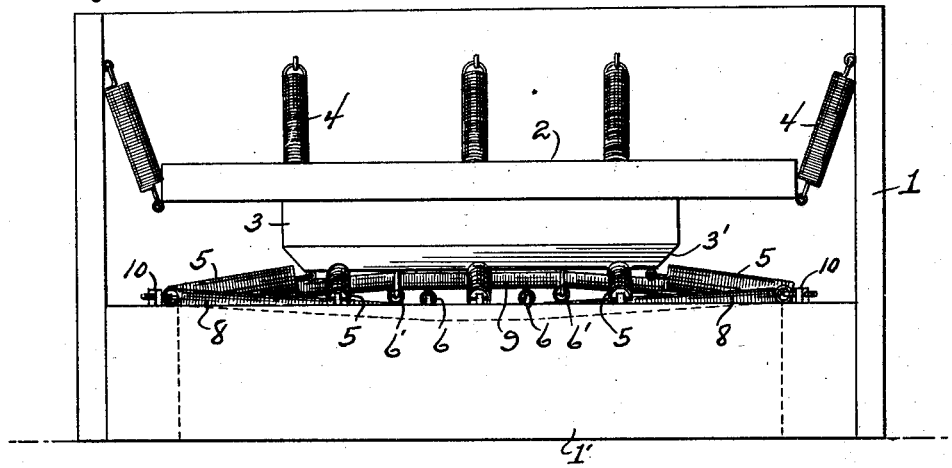
Figure 1 is a front view of a seat and its supporting frame constructed in accordance with this invention.
Figure 2:
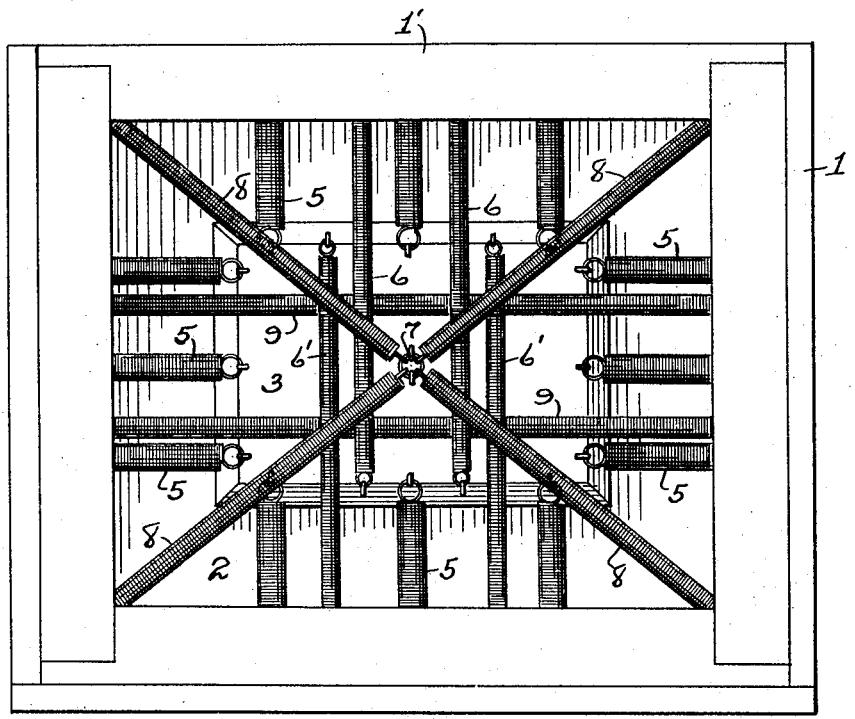
Figure 2 is a bottom plan view.

In these views, the numeral 1 indicates a supporting frame which may be a part of a vehicle, aircraft or the like, and 2 indicates the seat for the occupant. This seat is provided with a depending part 3. A plurality of expansion springs 4 is connected with the inner wall of the frame 1 and with the rear and side edges of the seat 2. A plurality of similar springs 5 is connected with the edges of the reduced lower part 3' of the part 3 and the outer ends of these springs are suitably connected with the inner frame 1' placed in the lower portion of the frame 1. A pair of springs 6 is connected with the rear part of the frame 1' and with the front lower edge of the reduced part 3 and a pair of springs 6' is connected with the front part of the member 1' and with the rear edge of the part 3'. These springs 6 and 6' therefore extend in opposite directions, with portions of the springs 6 lying parallel with portions of the springs 6'.

A ring 7 is connected with the central part of the lower face of the member 3, and four diagonally arranged springs 8 have their inner ends connected with the said ring and their lower ends connected with the corners of the frame 1', these springs 8 lying below the springs 6 and 6' and bearing against the same. A pair of springs 9 extend from one side of the frame 1' to the other, these springs being spaced apart and arranged in parallel relation and they pass over the springs 6 and 6' so that these springs 6 and 6' are arranged between the springs 8 and 9.

Figure 1 shows the diagonally arranged springs 8 provided with the tension adjusting means 10, and if desired, other of the springs or all of the springs can be provided with such means.

Thus it will be seen that the seat is yieldably supported by the plurality of springs and the peculiar arrangement of the springs will act to absorb all shocks and jars and thus prevent these shocks and jars being transmitted to the occupant of the seat. By providing the tension adjusting means, the tension of the springs can be regulated according to the weight of the occupant of the seat.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. In combination with a seat and its supporting frame, a plurality of tension springs connecting an under portion of the seat with the sides of the frame, a number of springs connected with the central part of the bottom of the seat and with the sides of the frame and forwardly and rearwardly extending springs connected with the under face of the seat and with the front and rear portions of the frame, the latter springs being arranged above the last mentioned springs, and transversely arranged springs having their ends connected with the sides of the frame and passing under the seat and engaging the forwardly and rearwardly extending springs.

2. In combination with a seat and its frame, a reduced depending portion on the bottom of the seat, a plurality of springs connected with the edges of said depending portion and with the sides of the frame, a number of springs connected with the rear edge of the depending portion and with a front portion of the frame, a number of springs connected with the front edge of the depending portion and with the rear part of the frame, four diagonally arranged springs connected with the central part of the depending portion and with the corners of the frame, the diagonal springs being arranged under the last mentioned springs, a pair of transversely arranged springs having their ends connected with the side portions of the frame and resting on the forwardly and rearwardly extending springs.

3. In combination with a seat and its frame, a reduced depending portion on the bottom of the seat, a plurality of springs connected with the edges of said depending portion and with the sides of the frame, a number of springs connected with the front edge of the depending portion and with the rear part of the frame, four diagonally arranged springs connected with the central part of the depending portion and with the corners of the frame, the diagonal springs being arranged under the last mentioned springs, a pair of transversely arranged springs having their ends connected with the side portions of the frame and resting on the forwardly and rearwardly extending springs and springs connected with the edges of the seat and with the rear and side portions of the frame, said springs extending downwardly from the frame.

In testimony whereof I affix my signature.

HERBERT FROMM.